3,159,684
PROCESS FOR PREPARING POLYPHENYL ETHERS
Edward P. Merica, Midland, Mich., assignor to The Dow
 Chemical Company, Midland, Mich., a corporation of
 Delaware
No Drawing. Filed Oct. 5, 1959, Ser. No. 844,156
1 Claim. (Cl. 260—613)

The present invention relates to polyphenyl ether lubricant compositions and is more particularly concerned with new compositions of matter containing isomeric mixtures of polyphenyl ethers, their method of preparation and their use as lubricants. The novel polyphenyl ether compositions can conveniently be characterized by the general formula

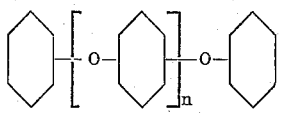

wherein the symbol $n$ represents a whole number of from 1 to 4 or more, inclusive, and wherein from about 50–98 percent of the phenylene radicals are meta-phenylene radicals.

The various individual isomers of the lower polyphenyl ethers, that is to say, the ortho, para and meta linked isomers wherein $n$ in the general formula above is 2 or 3, are known in the art. The chemical and physical properties of these known polyphenyl ethers such as stability at high-temperatures and high-pressures and excellent lubricity are also known. However, for example, the bis-(phenoxyphenyl) ether meta linked isomer, reported to be the most desirable isomer because of its low pour-point, is very difficult and expensive to prepare. An additional drawback of this meta linked isomer other than difficulty in preparation is that upon standing for short periods the super-cooled liquid will crystallize and cannot be re-liquified without heating to its melting point.

It is an object of the present invention to provide new compositions of matter useful as high-temperature lubricants. It is a further object of the present invention to provide new compositions of matter useful as synthetic lubricants which have low pour-points. It is another object of the present invention to provide novel methods for the preparation of the new compositions of matter. It is a further object to provide a novel method for preparing novel compositions containing high meta isomer content from easily obtainable and inexpensive starting materials. It is another object of the present invention to provide a process for the production of intermediates such as hydroxydiphenyl oxide which are useful in preparing other synthetic lubricants. These and other objects will become apparent to those skilled in the art from the following specification and claims.

It has now been found that certain mixtures of the various isomeric polyphenyl ethers having from 50 to about 98 percent of the phenylene radicals meta-phenylene radicals provide lubricant compositions which remain liquid at all temperatures above their pour-points and do not crystallize upon prolonged standing. The new compositions of matter can conveniently be prepared by reacting a halogenated diphenyl oxide, such as brominated or chlorinated diphenyl oxide, having at least 50 percent of the halogen substituted in the meta position, with aqueous alkali metal in the presence of a condensation catalyst, such as copper. Good results are obtained in either instance when the reaction is carried out at a temperature of from about 250° C. to about 350° C. It is to be understood that the molar ratios set forth hereinafter can be altered considerably yet some of the desired compositions can be obtained in a form which can be separated from the reactants and any undesirable reaction products which may be present.

The condensation catalyst which can be employed in accordance with the present invention is copper. Thus one can employ, for example, electrolytic copper dust, copper present as part of the reaction vessel, such as copper kettles, coil reactors and the like.

The alkaline conditions required of the present invention can be obtained by employing any one of the alkali metal hydroxides or carbonates. Thus, one can employ sodium hydroxide, potassium hydroxide, lithium hydroxide, cesium hydroxide, and rubidium hydroxide, sodium carbonate, potassium carbonate, lithium carbonate, cesium carbonate, and the like.

The temperature at which the condensation reaction of the present invention occurs to produce commercially satisfactory yields is from about 250° to about 350° C. and preferably from about 280° to about 340° C.

The following formulae illustrate the reactions which occur employing various reactants in accordance with the present invention to produce a corresponding polyphenyl ether having at least 50 percent of the phenylene radicals joined meta to one another along with a hydroxydiphenyl ether or hydroxypolyphenyl ether containing at least 50 percent meta hydroxy substitution.

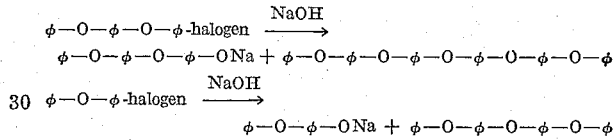

The lubricant composition, i.e., the mixtures of isomers, and the new compounds can be employed as synthetic lubricants per se or mixed with other well known lubricant bases, both synthetic and/or naturally occurring oils, with or without the use of corrosion inhibitors, pour-point depressants and the like. When extremely low pour-point is desired and concomitantly high-temperature stability is not required, then pour-point depressants can be employed to lower the pour-point in the usual manner but generally are lost if the lubricant composition is used under extreme pressure and/or temperatures.

The following examples are illustrative of the present invention but are not to be construed as limiting:

*Example 1—Hydroxydiphenyl Oxide and Bis (Phenoxyphenyl) Ether*

A charge of 996 g. (4 moles) of bromodiphenyl oxide containing 60 percent meta-bromo substitution, 880 g. (4.4 moles) of aqueous 20 percent sodium hydroxide and 8 g. of copper electrolytic dust was heated with stirring in a closed autoclave to a temperature of 280° C. at which the pressure was 775 p.s.i., and then immediately allowed to cool. Total time over 500 p.s.i. was 1 hour. Upon cooling to room temperature the reaction mixture was acidified with concentrated HCl and the resulting aqueous and organic layers which formed were separated. The organic layer was dried over magnesium sulfate and distilled under reduced pressure. As a result of these operations there was obtained 214.5 g. of monobromodiphenyl oxide containing 60 percent meta-bromo substitution, 360 g. of hydroxydiphenyl oxide containing 60 percent meta-hydroxy substitution and 126 g. of bis-(phenoxyphenyl) ether containing 60 percent of phenylene radicals. Based on starting material actually used, the yield of hydroxydiphenyl oxide was 61.5 percent and of bis(phenoxyphenyl) ether 23.5 percent.

*Example 2—Hydroxydiphenyl Oxide and Bis(Phenoxylphenyl) Ether*

A charge of 996 g. (4 moles) of bromodiphenyl oxide containing 60 percent meta bromo substitution, 880 g.

(4.4 moles) of 20 percent sodium hydroxide, 8 g. of copper electrolytic dust and 1 g. of Dowfax 2A1 (an anionic surfactant which is soluble in 20 percent caustic, produced by The Dow Chemical Company) was heated in an autoclave, with stirring until the pressure was 900 p.s.i. and then allowed to cool. On cooling to about room temperature the reaction mixture was acidified with concentrated hydrochloric acid and the resulting aqueous and organic layers which formed were separated. The organic material was distilled under reduced pressure to obtain 438 g. (59 percent) of hydroxydiphenyl oxide containing 60 percent meta-hydroxy substitution, boiling at 125–135° C. at 0.2 mm. and 130 g. (19 percent) of bis-(phenoxyphenyl) ether containing 60 percent of the meta isomer, boiling at 215° at 0.2 mm.

Example 3—Hydroxydiphenyl Oxide and Bis(Phenoxyphenyl) Ether

A charge of 748 g. (3 moles) of bromodiphenyl oxide containing 60 percent meta-bromo substitution, 1500 g. (7.5 moles) of 20 percent sodium hydroxide and 4 g. of copper electrolytic dust was heated in an autoclave with stirring until the pressure reached 1100 p.s.i. and held thereat for 1 hour. After cooling to room temperature the reaction mixture was acidified with concentrated hydrochloric acid. The aqueous and organic layers which formed were separated and the organic material distilled. A yield of 197 g. (34 percent) of hydroxydiphenyl oxide containing 60 percent meta isomer and 189 g. (36.5 percent) of bis-(phenoxyphenyl) ether containing 60 percent meta isomer was obtained.

Example 4

A charge of 498 g. (2 moles) of bromodiphenyl oxide containing 60 percent meta-bromo substitution, 880 g. (4.4 moles) of 20 percent sodium hydroxide, 4 g. of copper electrolytic dust, 1 g. of Dowfax 2A1 and 100 g. of bis(phenoxyphenyl) ether was heated in an autoclave, with stirring to 285° C. at which the pressure was 750 p.s.i., and held thereat for 1 hour. After cooling, the reaction mixture was shaken with toluene and the organic-toluene layer separated from the aqueous layer. The toluene layer was evaporated, leaving 98 g. of bis-(phenoxyphenyl) ether containing 60 percent meta isomer. The aqueous layer was acidified with concentrated hydrochloric acid and the organic phase which formed separated therefrom. The organic material was distilled to obtain 207 g. (55.5 percent) of hydroxy-diphenyl oxide containing 60 percent meta-hydroxy substitution, boiling at 138–147° C. at 1.3 mm.

Example 5

A charge of 374 g. (1.5 mole) of bromodiphenyl oxide containing 60 percent meta-bromo substitution, 874.5 g. (1.65 mole) of 10 percent sodium carbonate and 2 g. of copper electrolytic dust was heated in an autoclave equipped with stirring to 285° C. at which the pressure was 1200 p.s.i. The pressure was maintained at 1000 p.s.i. for 2 hours. After cooling, the contents were separated and the organic layer was distilled. A forerun of 34 g. was obtained, followed by 84 g. (30 percent) of hydroxydiphenyl oxide containing 60 percent meta-hydroxy substitution boiling at 145–150° C. at 1.6 mm., 66 g. (25.5 percent) of bis(phenoxyphenyl) ether containing 60 percent meta isomer boiling at 220–230° C.

at 1.8 mm. and 31 g. of residue which was probably additional bis-(phenoxyphenyl) ether.

Example 6

A charge containing 290 lbs. bromodiphenyl oxide (of which 50 percent was the meta isomer), 103 lbs. sodium hydroxide, 1053 g. copper electrolytic dust, 408 lbs. water and 214 g. Dowfax 2A1 was passed through a five-gallon continuously stirred autoclave at a rate of 42 lbs./hr. The temperature was maintained at 280° C. and the pressure at 1800 p.s.i. The effluent was cooled to room temperature and acidified. After separating, the organic layer was distilled. A 70 percent yield of hydroxydiphenyl oxide (of which 68 percent was the meta isomer) was obtained, plus a 10.5 percent yield of bis(phenoxyphenyl) ether containing a corresponding increase in meta substitution.

Example 7

In another run, using the same charge as Example 6, but a through-put of 258 lbs./hr., an 82.5 percent yield of hydroxydiphenyl oxide and 27 percent of bis(phenoxyphenyl) ether was obtained. In this run the meta substitution was increased 28 percent.

In the manner of the foregoing examples employing the chlorine analog there is obtained like results.

It is thus seen that by the method here set forth the hydroxylated starting material for the process of my copending application Serial No. 844,224 filed even date herewith can be prepared as well as desirable polyphenyl ether products in an isomeric mixture containing more than 50 percent of the meta isomers suitable for use as high temperature lubricants.

It is further to be understood that by certain of the techniques hereinbefore described the meta-isomer content of the products, both the phenol and ether, is increased above that of the starting material.

I claim:

A process for simultaneously preparing an isomeric mixture of polyphenyl ethers having at least 50 percent of the phenylene radicals meta-phenylene radicals and hydroxydiphenyl ethers having at least 50 percent meta substitution having the formulae

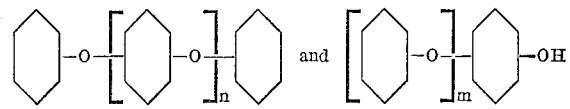

wherein $n$ represents an even integer from 2 to 4, inclusive, $m$ represents an integer from 1 to 3, inclusive, which comprises reacting a halogenated phenyl compound having the formula

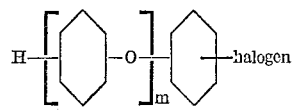

wherein halogen represents a halogen having an atomic number from 17 to 35, inclusive with aqueous alkali in the presence of a condensation catalyst at a temperature of from about 250° to about 350° C. and under autogenous pressure.

References Cited in the file of this patent
UNITED STATES PATENTS
1,744,961  Hale _____ Jan. 28, 1930